US009080920B2

(12) United States Patent
Keeter (10) Patent No.: US 9,080,920 B2
(45) Date of Patent: Jul. 14, 2015

(54) SYSTEM AND METHOD FOR MULTIPLEXED AND BUFFERED MINIATURIZED SENSOR ARRAYS (71) Applicant: Measurement Specialties, Inc., Hampton, VA (US)

(72) Inventor: Steven Mark Keeter, Newport News, VA (US)

(73) Assignee: Measurement Specialties, Inc., Hampton, VA (US)

( * ) Notice: Subject to any disclaimer, the term of this patent is extended or adjusted under 35 U.S.C. 154(b) by 259 days.

(21) Appl. No.: 13/785,742

(22) Filed: Mar. 5, 2013

(65) Prior Publication Data

US 2014/0251021 A1 Sep. 11, 2014

(51) Int. Cl.
*G01L 9/00* (2006.01)
*G01L 15/00* (2006.01)

(52) U.S. Cl.
CPC ...................................... *G01L 15/00* (2013.01)

(58) Field of Classification Search
CPC . G01L 9/0054; G01L 19/0084; G01L 9/0079; G01L 19/141; G01L 19/147; G01L 9/0042; G01L 15/00; G01L 9/0073; G01L 19/003; G01L 19/0092; G01L 19/0636; G01L 19/143; G01L 19/146; G01L 19/148
USPC .................................................... 73/700–756
See application file for complete search history.

(56) References Cited

U.S. PATENT DOCUMENTS

| 4,263,655 | A  | * | 4/1981 | Chappell, Jr. ................ 702/138 |
| 4,442,716 | A  | * | 4/1984 | Coe et al. ........................ 73/756 |
| 4,753,105 | A  | * | 6/1988 | Juanarena et al. ............. 73/1.62 |
| 5,269,311 | A  |   | 12/1993 | Kirchner et al. |
| 6,353,344 | B1 |   | 3/2002 | Lafort |
| 7,258,000 | B2 |   | 8/2007 | Tavares et al. |
| 2009/0058663 | A1 |   | 3/2009 | Joshi et al. |
| 2012/0016603 | A1 | * | 1/2012 | Martin et al. ................... 702/50 |

OTHER PUBLICATIONS

ESP Pressure Scanner User's Manual, Measurement Specialties Pressure Systems, Aug. 2009. www.PressureSystems.com.
Miniature Electronic Pressure Scanners, ESP-16HD/32HD/64HD, Measurement Specialties. 2009. www.PressureSystems.com.
DTC Initium Data System Used to Capture Turbulence, Measurement Specialties. Mar. 2013. www.meas-spec.com.

(Continued)

*Primary Examiner* — Andre Allen
(74) *Attorney, Agent, or Firm* — Howard IP Law Group, PC (57) ABSTRACT

A miniature pressure scanning system includes a plurality of miniature pressure sensors where each pressure sensors includes at least one sensor output for providing an analog output signal indicative of a detected pressure on a body, and each pressure sensor output has an associated output impedance; a plurality of buffers, each buffer electrically connected to the output port of a corresponding one of the pressure sensors, and configured to reduce the associated output impedance of the corresponding sensor output coupled thereto, and further configured to provide at an output of the buffer the analog output pressure signal from the pressure sensor; and a multiplexer coupled downstream of the plurality of buffers and configured to multiplex the buffered analog output pressure signals to output a multiplexed analog signal representing the detected pressures.

20 Claims, 10 Drawing Sheets

(56) References Cited

OTHER PUBLICATIONS

International Search Report dated Jun. 17, 2014 for related application PCT/US2014/020231.

Scanners and Systems—ESP-HD, Measurement Specialties, 2012, www.meas-spec.com/product/tm_product.aspx? id-9311, 3 pages.

* cited by examiner

SYSTEM AND METHOD FOR MULTIPLEXED AND BUFFERED MINIATURIZED SENSOR ARRAYS

FIELD OF THE INVENTION

The present invention relates to multiplexed miniaturized sensor arrays, in particular buffered miniaturized sensor arrays.

BACKGROUND OF THE INVENTION

Pressure sensing equipment is often used within the aerodynamic research field. The sensing equipment may be used in many applications such as windtunnel, flight test, and turbomachinery testing. For example, sensing equipment may be used in wind tunnel applications during the development of wing designs. Pressure sensing equipment may also be used for in-flight test applications such as monitoring the pressure conditions observed by a test missile, both around the missile and in crucial engine areas such as the inlet, combustor, and nozzle. For aerodynamic research, miniature pressure measurement instrumentation may be used that incorporates piezoresistive pressure sensor arrays of individual sensors. These miniature instruments, also called pressure scanners, may incorporate electronic multiplexers at the product's sensor substrate level for individual sensor selection to connect to an attached amplifier or other electronic circuit. Current state of the art miniature pressure scanners include the ESP line of miniature pressure scanners (e.g ESP-16HD, ESP-32HD, and ESP-64HD miniature pressure scanners) manufactured by Measurement Specialties, Inc. Pressure Systems and as described in the ESP Pressure Scanner User's Manual, dated August 2009, the subject matter thereof incorporated herein by reference in its entirety.

In a typical application, hundreds or even thousands of individual pressure sensors may be used and monitored in an aerospace application, with Bipolar and CMOS based multiplexers typically considered for such scanning needs. The need to scan across these sensors through the multiplexer at increasingly faster speeds has highlighted several problems relating to fast sensor settling times for pressure scanners. Limiting factors include a multiplexer's inherent charge injection, capacitance and resistance characteristics, and the pressure sensors' relatively high source impedance. In particular, during switching, voltage spikes are created on the multiplexed signals coming from each pressure sensor and through the multiplexer. These spikes must settle and decay in order for the signal line to return to its true value so that an accurate reading may be made. In addition, it has been observed that when pressure sensing equipment is used at higher ambient temperatures, the settling time for the voltage spikes is increased.

Alternate systems and methods for miniature electronic pressure scanning that reduce the settling time of multiplexer voltage spikes are desired.

SUMMARY OF THE INVENTION

A miniature pressure scanning system may comprise: a plurality of miniature pressure sensors including a plurality of sensor outputs, each of the miniature pressure sensors including at least one pressure sensor output for providing an analog output signal and each at least one sensor output having an associated output impedance; a plurality of buffers, each buffer electrically coupled to one sensor output of the plurality of sensor outputs and providing a buffered sensor output, and each buffer configured to reduce the associated output impedance of the one sensor output coupled to it; and at least one multiplexer downstream of each said buffer and configured to multiplex the buffered analog output pressure to provide a multiplexed analog signal for output to another device.

The plurality of buffers may comprise a plurality of transistors and plurality of bias resistors, and each buffer coupled to one sensor output may comprise one of the plurality of transistors and one of the plurality of bias resistors. In an embodiment, one or both of the one of the plurality of transistors and the one of the plurality of bias resistors may be integral to the one of the plurality of miniature pressure sensors it is buffering. In another embodiment, one or both of the one of the plurality of transistors and the one of the plurality of bias resistors may be configured as a bare die element mounted on a substrate of the miniature pressure scanning system. Each of the plurality of transistors may be a one of a bipolar junction transistor, a field-effect transistor, a metal oxide semiconductor field-effect transistor, and an insulated-gate bipolar transistor. In one embodiment, the at least one multiplexer may have at least 16 input channels. The at least one multiplexer may also be operative to be switched at a rate of 50 micro seconds per buffered or unbuffered sensor output or faster. Each buffer may be configured to reduce the associated output impedance of the sensor output coupled to it by at least two orders of magnitude.

A method for sensing pressure may comprise: sensing pressure using a plurality of miniature pressure sensors including a plurality of sensor outputs, each of the plurality of miniature pressure sensors having at least one sensor output for providing an analog output signal and each at least one sensor output having an associated output impedance; buffering the at least one sensor output of at least some of the plurality of miniature pressure sensors and providing a buffered sensor output, thereby reducing the associated output impedance of each buffered sensor output; multiplexing, using at least one multiplexer, the plurality of buffered sensor outputs; and switching between channels of the at least one multiplexer, thereby reading the analog output signal of each buffered sensor output of the plurality of sensor outputs.

Buffering the at least one sensor output of at least some of the plurality of miniature pressure sensors may comprise electrically coupling one of a plurality of transistors and one of a plurality of bias resistors to each sensor output being buffered. In an embodiment, one or both of the one of the plurality of transistors and the one of the plurality of bias resistors may be integral to a substrate of the one of the plurality of miniature pressure sensors whose sensor output is being buffered. In another embodiment, one or both of the one of the plurality of transistors and the one of the plurality of bias resistors may be configured as a bare die element mounted on a substrate of the miniature pressure scanning system. Each of the plurality of transistors coupled to one of the plurality of miniature pressure sensors may be one of a bipolar junction transistor, a field-effect transistor, a metal oxide semiconductor field-effect transistor, and an insulated-gate bipolar transistor. The at least one multiplexer may have at least 16 input channels. In an embodiment, switching between channels of the at least one multiplexer may comprise switching at a rate of 50 micro seconds or faster per buffered sensor output. Buffering at least one sensor output of at least some of the plurality of miniature pressure sensors may reduce the associated output impedance of each buffered sensor output at least two orders of magnitude.

A miniature pressure scanning system may comprise: an array of silicon piezoresistive pressure sensors including a plurality of sensor outputs, each of the pressure sensors including at least one sensor output for providing an analog output signal and having an associated output impedance; a plurality of buffers, each buffer of the plurality of buffers being electrically coupled to the at least one sensor output of each of the array of silicon piezoresistive pressure sensors thereby providing a plurality of buffered sensor outputs, each buffer comprising one of a plurality of transistors and one of a plurality of bias resistors and each buffer being operative to reduce an output impedance of the sensor output it is coupled to; and at least one multiplexer electrically coupled to the plurality of buffered sensor outputs, the at least one multiplexer being operative to be switched between each of the buffered sensor outputs.

In one embodiment, each buffer transistor and buffer bias resistor electrically coupled to a corresponding pressure sensor is configured as a bare die element mounted on a substrate of the miniature pressure scanner. In another embodiment, one or both of the buffer transistor and buffer bias resistor is integral to the corresponding pressure sensor whose sensor output the one of the buffers is buffering. The at least one multiplexer may have at least 16 input channels. The at least one multiplexer may be operative to be switched at a rate of 50 micro seconds per sensor output or faster. In an embodiment, each buffer may be configured to reduce the output impedance of the sensor output it is coupled to by at least two orders of magnitude.

DETAILED DESCRIPTION

Figure 1:
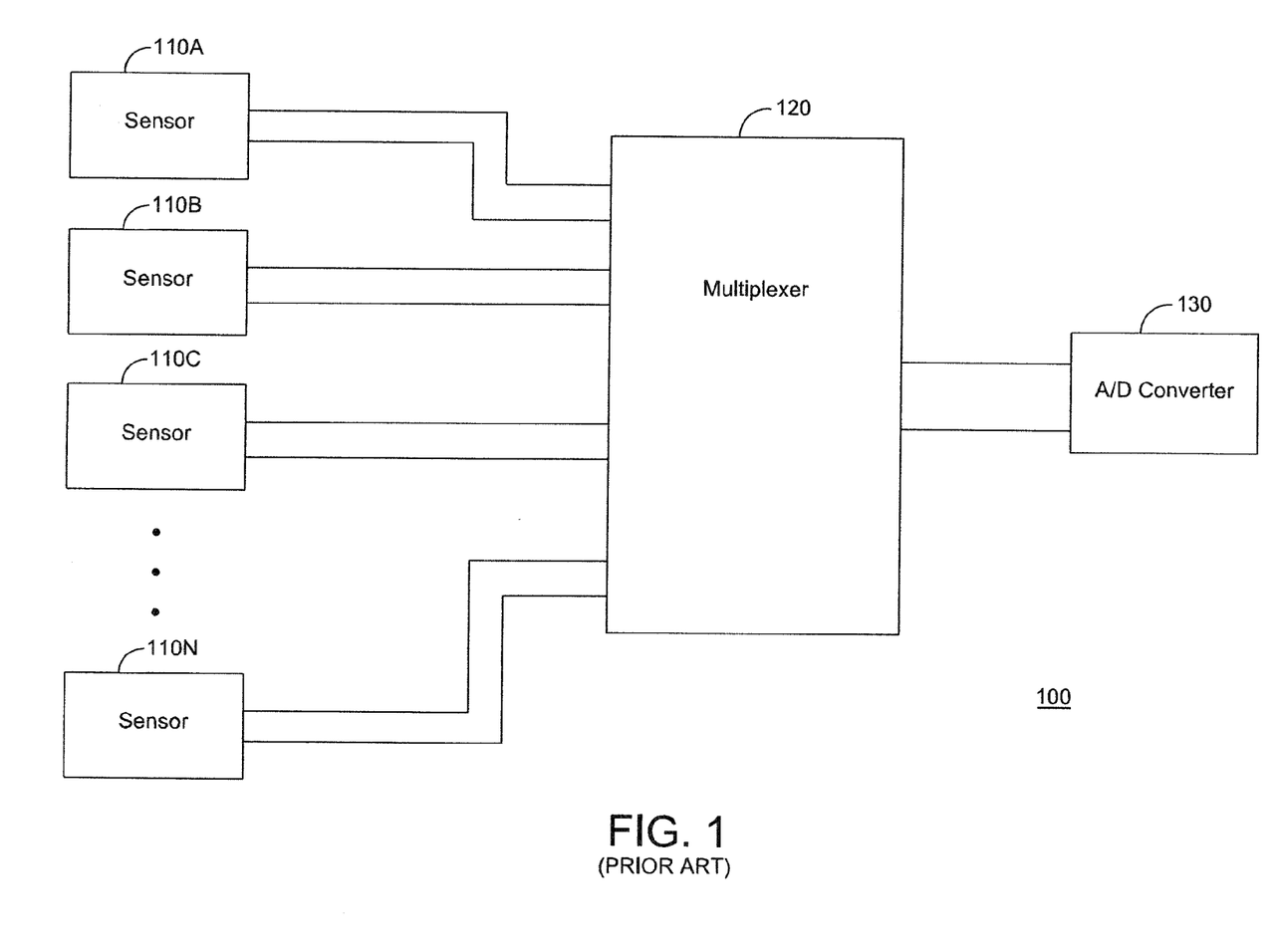
FIG. 1 is a notional representation of a miniature electronic pressure scanner of the prior art.

FIG. 1 is a notional representation of a miniature electronic pressure scanner 100 such as an ESP pressure scanner manufactured by Measurement Specialties, Inc. Pressure Systems. Such miniature electronic pressure scanner includes a plurality of miniature electronic differential pressure measurement units or pressure sensors 110A-110N. In an exemplary embodiment, this arrangement may be configured as an array of silicon piezoresistive pressure sensors, one for each pressure port. The pressure sensors may be mounted on a common hybrid glass substrate. The pressure sensors are electrically connected to multiplexer 120, which typically may have 16 input channels. As will be understood, the multiplexer allows the sensor outputs of each sensor to be addressed individually. In an embodiment in which there are more sensor outputs than input channels for the multiplexer, multiple multiplexers may be used. In an embodiment, an analog to digital (A/D) converter 130 may be connected to the output of the multiplexer. In another embodiment, other electrical devices such as an amplifier may be connected to the output of the multiplexer. However, a problem with such a configuration is the relatively long settling times associated with the time required for voltage spikes created on the multiplexed signals emanating from each miniature pressure sensor to decay and return the signal line to its true value.

Figure 2:
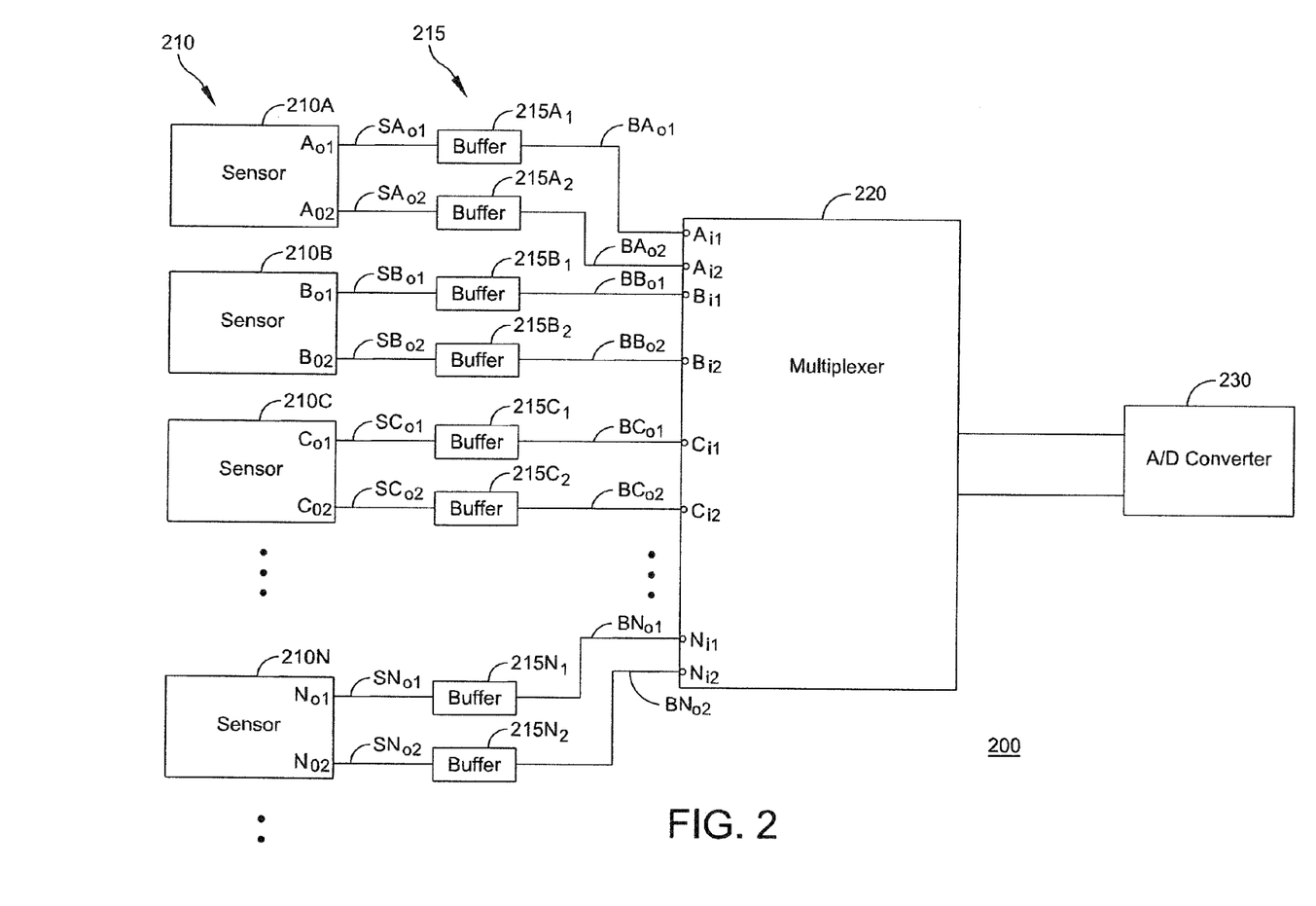
FIG. 2 is a notional representation of a miniature electronic pressure scanner with a voltage buffer between each pressure sensor output and multiplexer input according to an embodiment of the invention.

Referring now to FIG. 2, there is shown a notional representation of a miniature electronic pressure scanner 200 according to an embodiment of the disclosure and configured to mitigate the relatively long settling time problems associated with the configuration of FIG. 1. As shown, a plurality of miniature pressure sensors 210A-210N are configured such that each of the corresponding output ports ($210A_{O1}$, $210A_{O2}$, $210B_{O1}$, $210B_{O2}$, . . . , $210N_{O1}$, $210N_{O2}$) is connected to a corresponding input of a respective buffer (labeled generally as 215). Each of the buffers 215 ($215A_1$, $215A_2$, $215B_1$, $215B_2$, . . . $215N_1$, $215N_2$) is directly connected between each corresponding sensor output and a multiplexer 220 input port ($220A_{i1}$, $220A_{i2}$, $220B_{i1}$, $220b_{i1}$, . . . $220N_{i1}$, $220 N_{i2}$). According to an aspect of the present disclosure, placing buffers between the output of each sensor and the multiplexer greatly improves signal settling characteristics associated with the pressure scanner 200.

According to a further aspect of the disclosure, each miniature buffer 215 is composed of a simple transistor common collector emitter-follower voltage buffer or equivalent in bare die form (i.e., unpackaged semiconductor electrical elements) mounted on a substrate. Use of this type of buffer in the configuration as shown effectively reduces the pressure sensors' bridge output impedance by multiple orders of magnitude. The sensor or source's output impedance plays a dominant role in the system settling time constant, and it has been discovered that the electronic pressure sensor analog output-buffer-multiplexer configuration as described herein dramatically improves/reduces this time constant, and therefore allows faster scanning or multiplexing speeds.

As described above with respect to the conventional configuration of FIG. 1, an embodiment of a miniature electronic pressure scanner without sensor buffers is a scanner such as the Measurement Specialties ESP 64HD. The pressure sensors used within that unit are Measurement Specialties P3377-Ultrastable™ Sensors, where each of the sensors has two sensor outputs. The multiplexer may be embodied as an Analog Devices ADG507 module, which is a packaged electrical element, but the multiplexer may also be a bare die element without packaging. Typically, the multiplexer will have 16 channels, and the number of multiplexers used will depend on the number of pressure sensors being monitored. Without a buffer, the output impedance of each of the sensor outputs is approximately 2500 ohms.

In accordance with an embodiment of the present disclosure, configuring the system using buffer 215 at the sensor 210 output, realizes an output impedance (as seen from the input of multiplexer 220) of as low as 20 ohms, representing a reduction of the output impedance of more than two orders of magnitude. In an embodiment, each buffer 215 of the array of buffers may be embodied as a 2N3904 transistor manufactured by Central Semi and 2000 ohm bias resistor from Mini-Systems Inc. Such a buffer arrangement has been observed to provide an approximate 20 ohm output resistance for the sensor. The unique configuration of employing a voltage buffer on each output node of a pressure sensor for sensor arrays to improve signal settling results in a very small, simplistic electronic voltage buffer that greatly improves the output impedance of the sensor output and the associated system electronics. Thus, buffering of the sensor outputs is performed in a manner that is economical and requires minimal component real estate. An additional feature of this design is that including the buffer reduces the common mode voltage bias level by the amount of the transistor emitter voltage drops. This reduction in the sensor's common mode voltage has beneficial performance implications for the upstream amplifier and/or other electronics.

The transistor and bias resistor buffer may be implemented in different configurations to form a voltage buffer. Transistors types may include bipolar junction transistors (BJTs), field-effect transistors (FETs), metal oxide semiconductor field-effect transistors (MOSFETs), insulated-gate bipolar transistors (IGBTs), and other types of transistors with simple resistive biasing network. In an embodiment, the transistor and resistor are configured as bare die elements (electrical elements without packaging) that are mounted or affixed to an open area of the circuit board substrate to which the sensors and multiplexers are mounted. Each transistor and resistor may then be electrically connected to a sensor output using bond wires, or using circuit traces if the circuit board has been configured to support the transistor and resistor.

In another embodiment, the transistor and resistor may be integrated into the substrate of the pressure sensor die of the sensor whose sensor output(s) are being buffered, in which case bare die transistor and resistors will not have to be included on the circuit board substrate as described above. In another embodiment, the buffer may be comprised of a bare die transistor mounted on the circuit board substrate, and a resistor that is integral to the pressure sensor. A sensor die may typically include an unused resistor (a resistor within the sensor that is not used to implement the sensor's sensing functions) which may be used to bias the transistor, thereby eliminating the need to integrate an additional bare die resistor onto the circuit board substrate. As will be understood, the size of the transistors and resistors used may depend on the particular scanner being used, the available space for those components in either bare form on the circuit board or integrated within the pressure sensor die, and the desired output impedance. In an embodiment in which a plurality of sensor outputs are being buffered, a plurality of buffers are needed, and the plurality of buffers will include a plurality of buffer transistors and bias resistors. The term buffer as used herein generally refers to a single transistor and single resistor coupled to a single sensor output, however, a buffer may alternatively refer to more than one set of transistors and resistors, such as a buffer that buffers both (or more) of the outputs of a given pressure sensor. For example, a buffer that buffers two sensor outputs on a sensor will include two transistors and two bias resistors.

Still referring to FIG. 2, the analog output signal (indicated generally as SA) provided by each of the sensor outputs is passed through a corresponding buffer 215 to the multiplexer 220. That is, each output signal from each sensor output may be termed an analog output pressure signal ($SA_{O1}$, $SA_{O2}$, $SB_{O1}$, $SB_{O2}$, . . . , $SN_{O1}$, $SN_{O2}$) indicative of the pressure detected by the pressure sensor element associated with the various locations on a test member. Each sensor output signal that is passed through a buffer 215 may be termed a buffered analog output signal ($BA_{O1}$, $BA_{O2}$, $BB_{O1}$, $BB_{O2}$, . . . , $BN_{O1}$, $BN_{O2}$) and representing the analog output pressure signal, but having at least a reduced output impedance as seen from the input of the multiplexer 220. As noted, where the number of sensors being read exceeds the number of input channels for the multiplexer, more than one multiplexer may be used. In an example, if one hundred sensors 210 are being monitored, and each sensor has two sensor outputs, then the system would have two hundred sensor outputs to multiplex. In this embodiment, at least thirteen (13) sixteen channel multiplexers would be needed to receive the two hundred outputs of the one hundred sensors. In an embodiment in which each output is buffered, two hundred buffers would be needed, one for each of the sensor outputs. In other embodiments (not shown), it is possible that not every output would be buffered. For example, in an exemplary embodiment only one of the outputs on each of the sensors would be buffered (i.e., resulting in half of the total outputs being monitored). In this embodiment, it is conceivable that strategies directed to the order in which buffered and unbuffered outputs are addressed could be used to minimize settling time limitations caused by the unbuffered outputs. As will be understood, however, from a performance standpoint, buffering of every sensor output would result in a system with the least potential for experiencing settling time problems.

Figure 3:
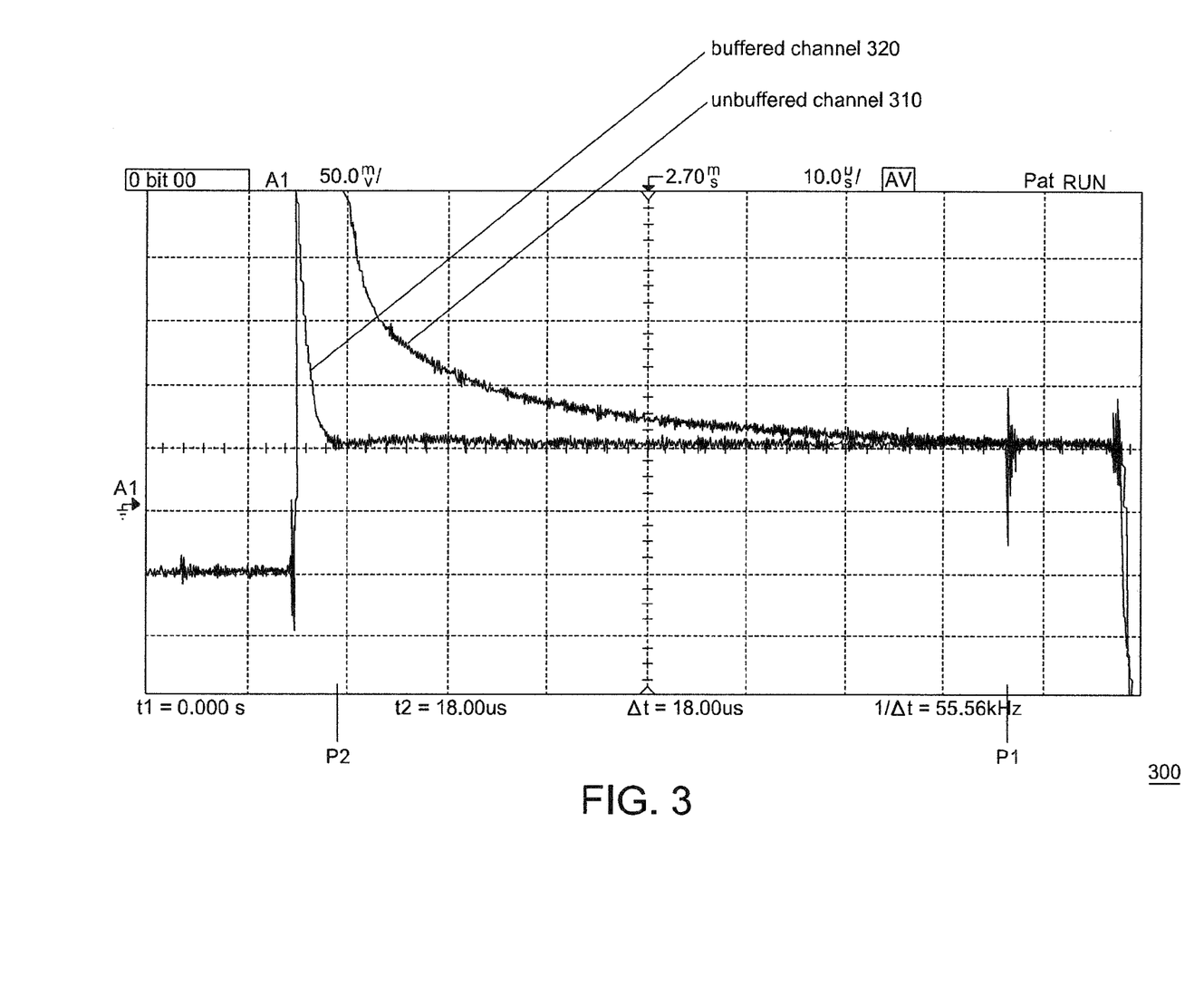
FIG. 3 is an exemplary oscilloscope trace that shows settling times of buffered and unbuffered output channels of a multiplexer.
Figure 4:
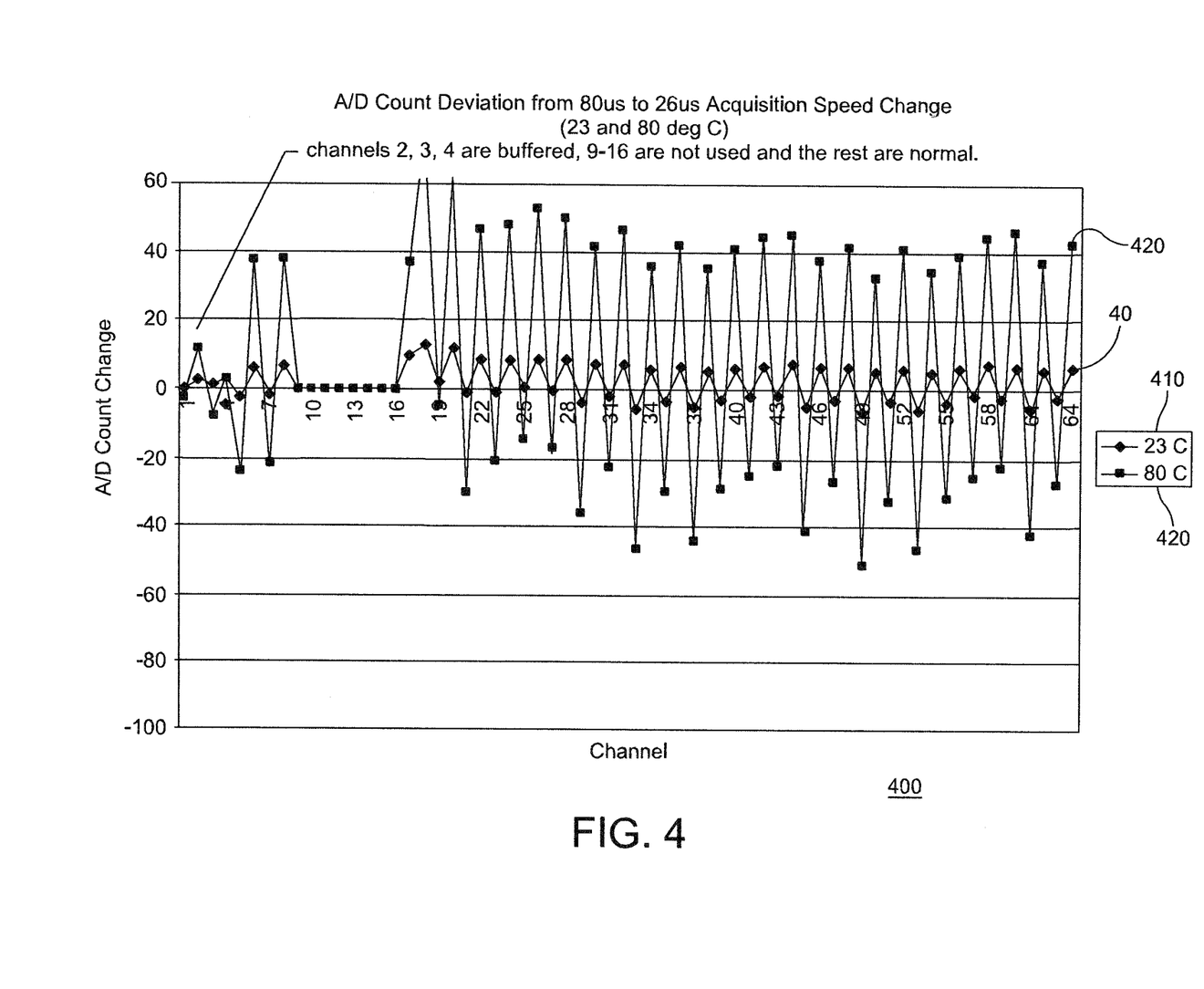
FIG. 4 is a graph showing sample system performance improvement in raw A/D count change at different temperatures of buffered and unbuffered scanners using an Initium data acquisition system.

FIGS. 3 and 4 illustrate the significant improvement in switching times realized by embodiments of the invention, relative to conventional unbuffered pressure scanning. Specifically, FIG. 3 is an exemplary oscilloscope trace 300 that shows settling times of buffered and unbuffered channels on an ESP 64HD pressure scanner. As shown in FIG. 3, line 310 represents the unbuffered channel and shows that because of the voltage spike attributable to the multiplexer, the signal takes more than 60 microseconds to settle to a state in which it is readable at point P1. In contrast, line 320 represents a channel to which a buffer was added. As shown, line 320 settles within 10 microseconds (approx. 8 microseconds after spiking) at point P2. The quick switching time of the buffered sensor greatly increases the rate at which individual sensors may be scanned by the multiplexer. Implementing a pressure scanner with buffered sensor outputs as described herein allows the multiplexer to have a switching rate of 50 microseconds per output channel. As shown by line 320, it may be possible to achieve a faster multiplexer switching time such as 10 microseconds per output channel with appropriate buffering to reduce the settling time of the multiplexer voltage spikes.

In an embodiment, the output of the multiplexer of the scanner systems shown in FIGS. 2 and 3 may be electrically connected to an analog to digital (A/D) converter to provide a digital output of each sensor output reading. Counts may be made of the output of the A/D converter, which are indicative of how many sensor output readings are observed from the A/D output. Raw A/D counts may be made of buffered and unbuffered output channels to assess the performance of those output channels under different operating conditions. In FIG. 4, a graph 400 shows sample system performance improvement of the electronic pressure scanner in raw A/D (analog to digital) counts for a given data acquisition system. The data acquisition system collects the change in raw A/D counts from scanning speeds from 80 microseconds (80uS) to 26uS. Data was also collected at different temperature conditions, at 23 degrees Celsius (C) and the other at 80 degrees Celsius. As indicated in FIG. 4, channels 2, 3, and 4 were buffered (using a single transistor emitter-follower arrangement as described herein), channels 9-16 were not used, and channels 17-64 were unbuffered.

As shown in FIG. 4, higher ambient temperatures result in an increase in the A/D count change. This is at least in part because the higher temperatures increase the settling time for the multiplexers, with the increased settling time resulting in a lower number of counts and, hence, an increased change in the number of counts. Thus, as shown in FIG. 4, the count change (i.e., the change in the number of counts) was much higher at 80 Celsius (reflected in line 420) than 23 C (reflected in line 410), for both the buffered and unbuffered output channels. At either temperature, a significant improvement is seen on the buffered output channels compared to the unbuffered output channels. The count changes of the unbuffered output channels are represented by a large saw-tooth pattern indicative of a drastic fluctuation in the number of A/D counts, indicating that the number of sensor readings changed drastically because of the long settling times associated with the unbuffered output channels. In contrast, the buffered output channels showed a much less drastic change in A/D count performance, indicating that the number of sensor output readings made did not change as much because of the short settling times of the buffered output channels. This A/D system utilizes a +/−5-volt signal swing for 16-bit range operation, which results in approximately 0.003% fullscale bit weight per count. As shown in FIG. 4, the 80 celsius scanning error comparing 26 microsecond to 80 microsecond scanning times of the unbuffered sensor outputs is approximately 50 counts or 0.15% fullscale error, while the same scanning of buffered sensor outputs results in errors close to the systems resolution limit. Even at 23 celsius, comparing the same 26 microsecond to 80 microsecond scanning times, the unbuffered sensor output A/D count error is still approximately 10 counts or 0.03% fullscale, while the buffered sensor output error is not perceivable.

Figure 5:
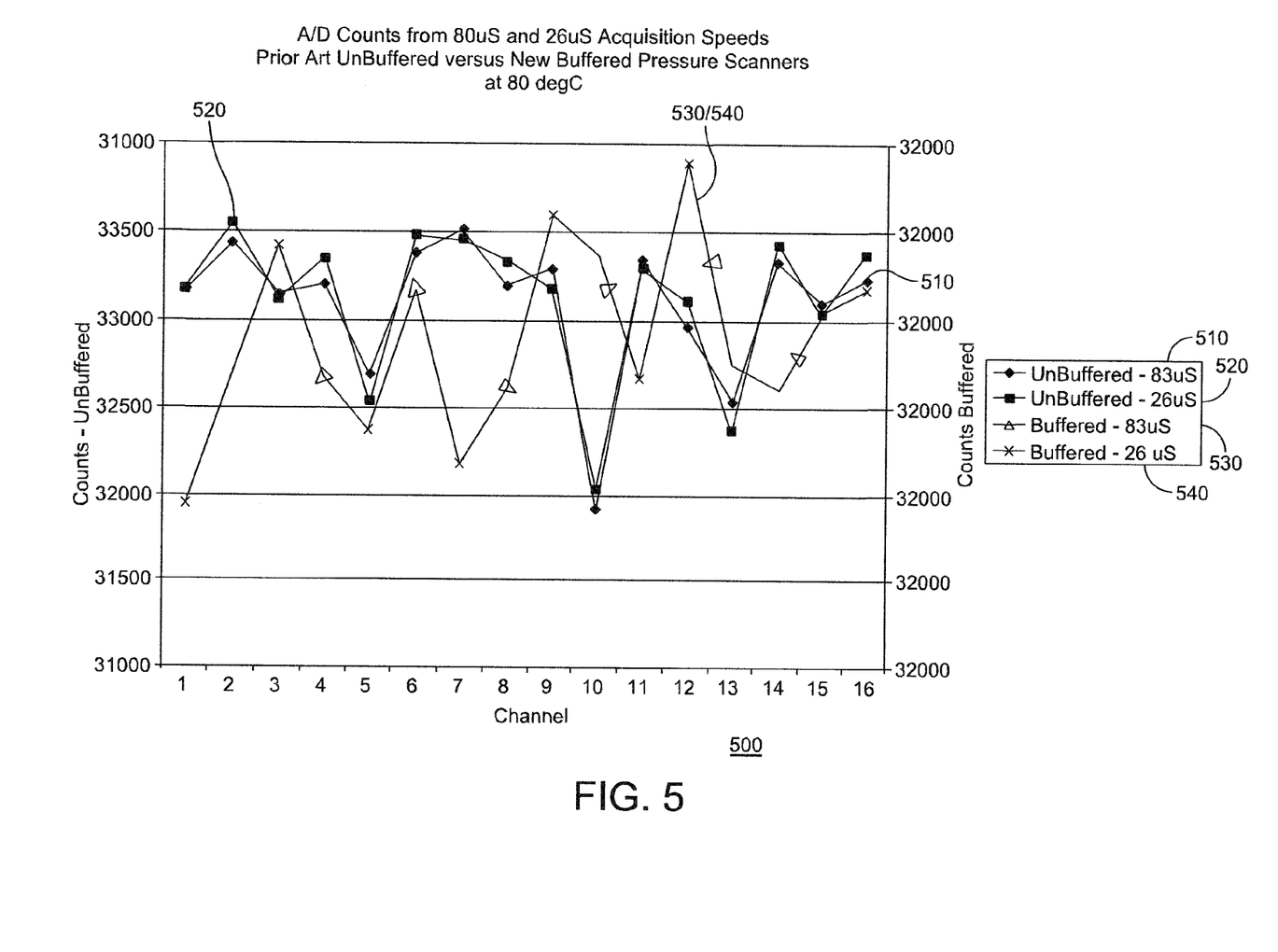
FIG. 5 is a graph showing sample system performance improvement in raw A/D counts at 80 degrees Celsius of buffered and unbuffered scanners using an Initium data acquisition system.

FIG. 5 shows a graph 500 of sample system performance improvement of the electronic pressure scanner in raw A/D (analog to digital) counts at different acquisition speeds and temperatures, for a given data acquisition system. FIG. 5 graphs the A/D counts of an unbuffered output at 83 microseconds scanning speed, an unbuffered output at 26 microseconds scanning speed, a buffered output at 83 microseconds scanning speed, and a buffered output at 26 microseconds scanning speed. As in FIG. 4, the buffered channels 530 and 540 of FIG. 5 illustrate significant improvement in performance over their unbuffered counterparts 510 and 520, respectively. In particular, FIG. 5 shows that the buffered output lines 530 and 540 operate very similarly (as shown by the graph lines essentially tracking one another) at different scanning speeds of 26 and 83 microseconds. In contrast, unbuffered output lines 510 and 520 show a separation between them, indicating that the unbuffered lines experience a discernible difference in performance at different scanning speeds. As discussed herein, this difference in performance is attributable to factors such as voltage spikes that cause long settling times in unbuffered output lines.

Figure 6:
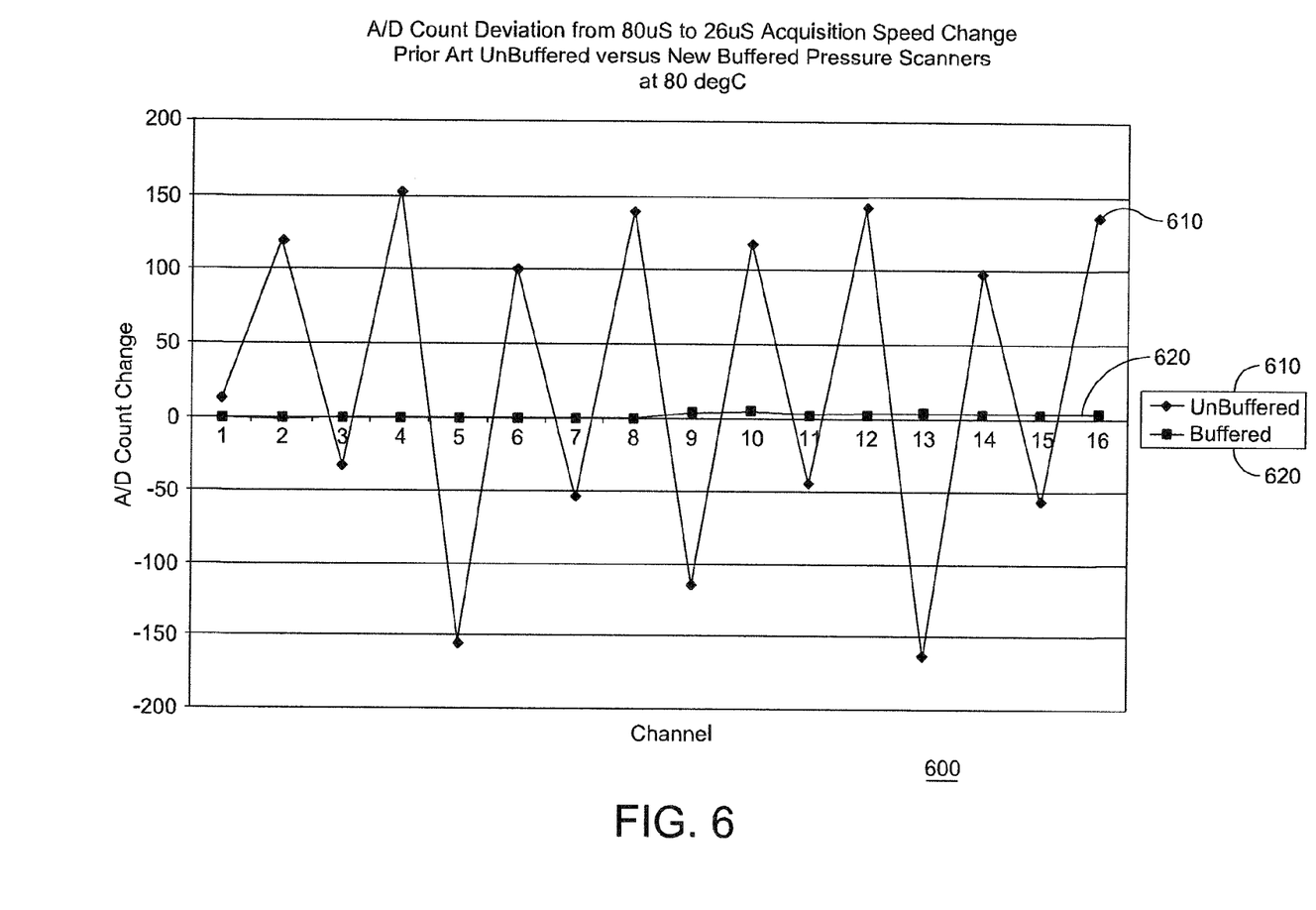
FIG. 6 is a graph showing sample system performance improvement in raw A/D count change at 80 degrees Celsius of buffered and unbuffered scanners using an Initium data acquisition system.

FIG. 6 is a graph 600 showing sample system performance improvement of the electronic pressure scanner in A/D (analog to digital) count changes for buffered and unbuffered outputs, using a given data acquisition system. The data acquisition system collected the change in raw A/D counts from scanning speeds from 80uS to 26uS. As shown in graph 600, the line representing the unbuffered output 610 shows a marked sawtooth pattern, which is indicative of settling time limitations associated with unbuffered outputs. In contrast, line 620 representing the buffered outputs shows a fairly flat A/D count change, indicating that the change in scanning speeds has a much smaller effect, if any, on A/D count change of the buffered outputs.

Figure 7:
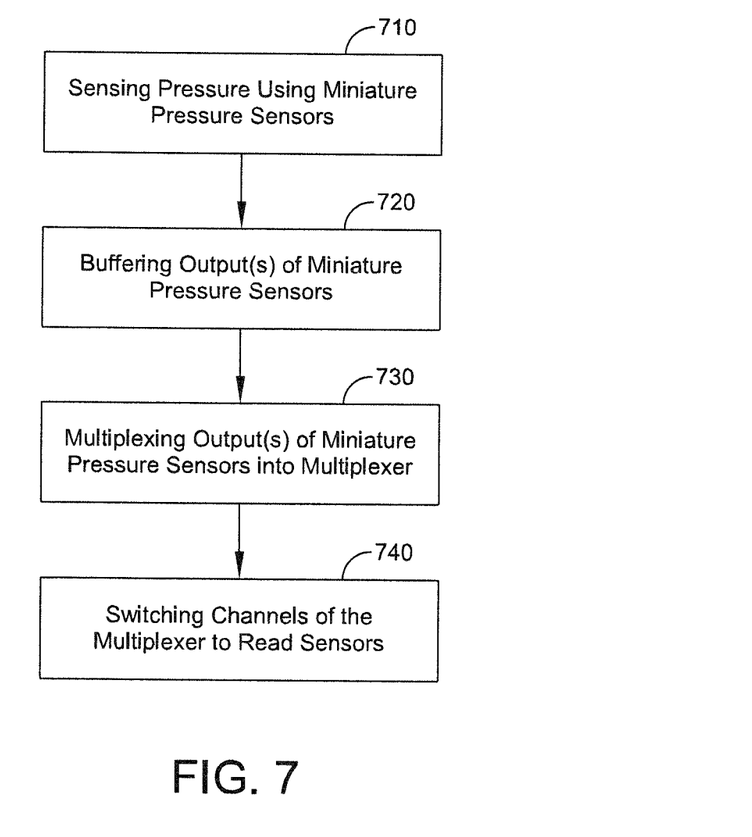
FIG. 7 is a block diagram showing steps of a method for measuring pressure according to an embodiment of the invention.

FIG. 7 is a simplified logic flow chart or diagram illustrating processing steps according to aspects of the disclosure. At block 710, pressure is sensed using a plurality of miniature pressure sensors associated with various locations on a body for sensing pressure thereon. Each pressure sensor has one or more outputs and generates one or more analog output signals representative of the sensed pressure. Each sensor output also has an associated output impedance. At block 720, one or more of the sensor outputs using a buffer that is electrically coupled to the output port of the sensor and to an input port of a multiplexer. Each buffer is operative to pass through the analog output pressure signal of the sensor output coupled thereto, and configured to reduce the output impedance of the sensor output coupled to it. As discussed, the buffer may comprise a bipolar junction transistor and a bias resistor. At block 730, the buffered output pressure signals from the sensor outputs are multiplexed, using a multiplexer. A typical multiplexer may have 16 input channels, although other configurations (e.g., 8 channel or 32 channel) may also be used. As will be understood, a multiplexer allows all of the output signals to be routed to a single receiving device, such as an A/D converter, which eliminates the need to have a separate receiving device for each output line. As noted, wind aerodynamics applications may have a thousand or more sensors, thereby eliminating the need for multiple receiving devices such as A/D converters and resulting in substantial savings both in terms of space and cost. Finally at block 740, switching is performed between channels of the multiplexer, thereby selectively reading the buffered output(s) of each of the miniature pressure sensors. A computer processor and associated logic may be used to cause the multiplexer to switch between channels. Because the buffer between the sensor outputs and multiplexer greatly reduces the settling time of the multiplexer channels, the timing of the switching can be much faster than without the buffer.

Figure 8:
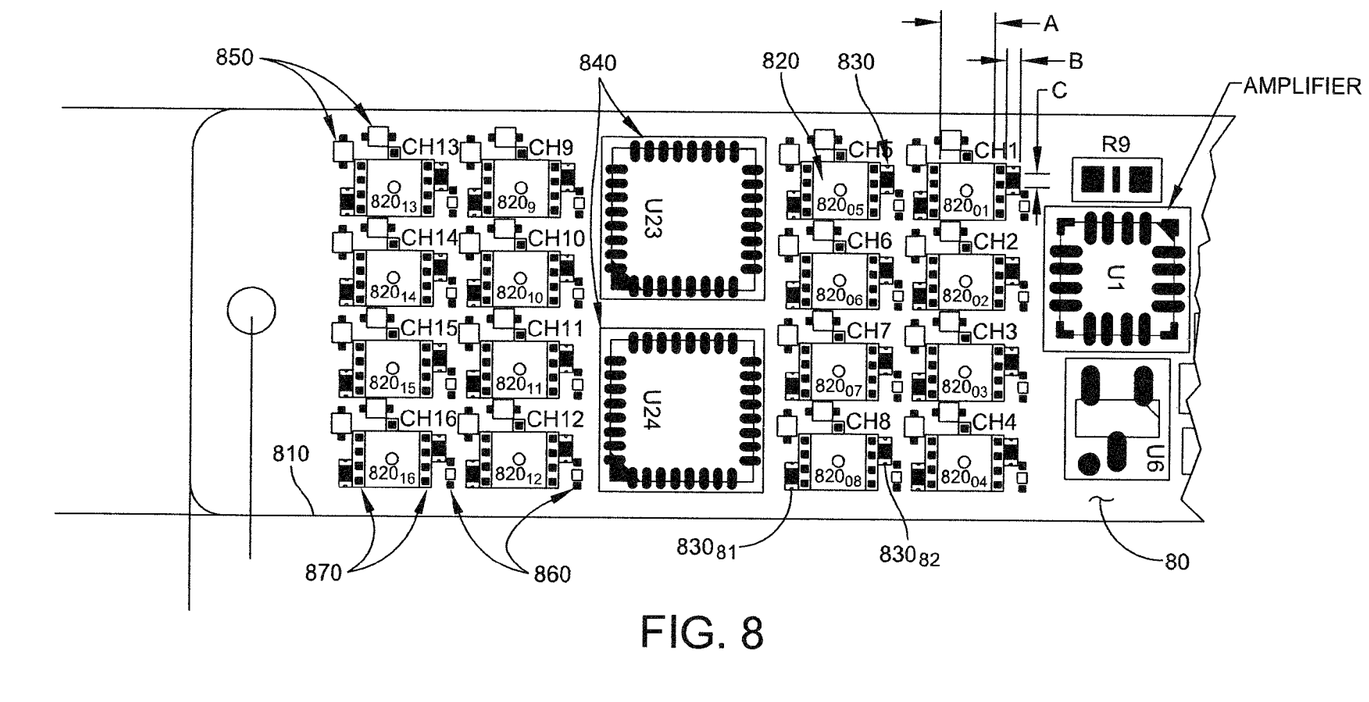
FIG. 8 is a topographic view of an exemplary circuit board of a miniature electronic pressure scanner.

FIG. 8 is a topographical view of a portion of an exemplary circuit board of a miniature electronic pressure scanner 200 as represented for example, in FIG. 2. The embodiment of FIG. 8 depicts a scanner 800 that includes pressure sensors labeled generally as 820 electrically coupled to multiplexers labeled generally as 840 via, buffers labeled generally as 830. In the configuration shown in FIG. 8, 16 each of pressure sensor elements ($820_1, \ldots, 820_{16}$) is associated with a respective channel (e.g. CH1, . . . , CH16) and provides two analog outputs. Coupled to each pressure sensor analog output is a corresponding buffer bias transistor (e.g. $830_{81}$ and $830_{82}$ for pressure sensor $820_8$ of CH8) where in the embodiment shown, the associated buffer resistors are integral to the sensor 820. Multiplexers 840 are also disposed on substrate 810. FIG. 8 also depicts locations 850 for trim resistors, locations 860 for span compensation resistors, and wire bond pads 870 to connect each pressure sensor to the substrate 810. In an exemplary embodiment, a miniature pressure sensor 820 may be a square semiconductor element in which each side (dimension A on FIG. 8) is approximately 0.074 inches in length and the bare die transistor 830 may be an unpackaged semiconductor element having sides with lengths of approximately 0.015 inches (dimension B)×0.018 inches (dimension C).

As depicted in FIG. 8, the array of miniaturized pressure sensors 820 is configured such that each sensor output is buffered by a bare die transistor 830 for each output (hence each sensor 820 has two bare die transistors next to it on or adjacent to) the substrate). The bias resistor for each output is within or integral to each sensor element 820 and hence not shown. In other embodiments, the bias resistor may be a separate bare die resistor for each buffer on the substrate. As shown, buffer transistor 830 is only a fraction of the size of the pressure sensor element 820, and the ratio of the area of the bare die buffer transistor to the area of the sensor is very small, with the buffer transistor being less than about 5% (e.g. approximately 4.9%) of the area of the sensor.

As will be understood, in an embodiment in which the bias resistor is a bare die element mounted on the substrate rather than integral to the pressure sensor, the ratio of the area of the bare die buffer elements to the sensor will be larger than about 4.9% because of the addition of the bare die resistor, and a topological view of this embodiment would include a bare die element for the resistor mounted on the substrate. Nevertheless, because the bare die resistor is typically smaller than the bare die transistor, the ratio of the area of the bare die buffer transistor and bare die resistor combination will be less than about 10% of the area of the sensor (the sensor area being unchanged from the integral embodiment). In an embodiment in which both the transistor and bias resistor that make up the buffer are part of and integral to the sensor element 820, a topological view of such embodiment would not include either a bare die transistor or bare die resistor next to (adjacent) each sensor. Thus, the integrated pressure sensor and buffer configuration provides for the requisite functionality having reduced area relative to the aforementioned embodiments.

Figure 9:
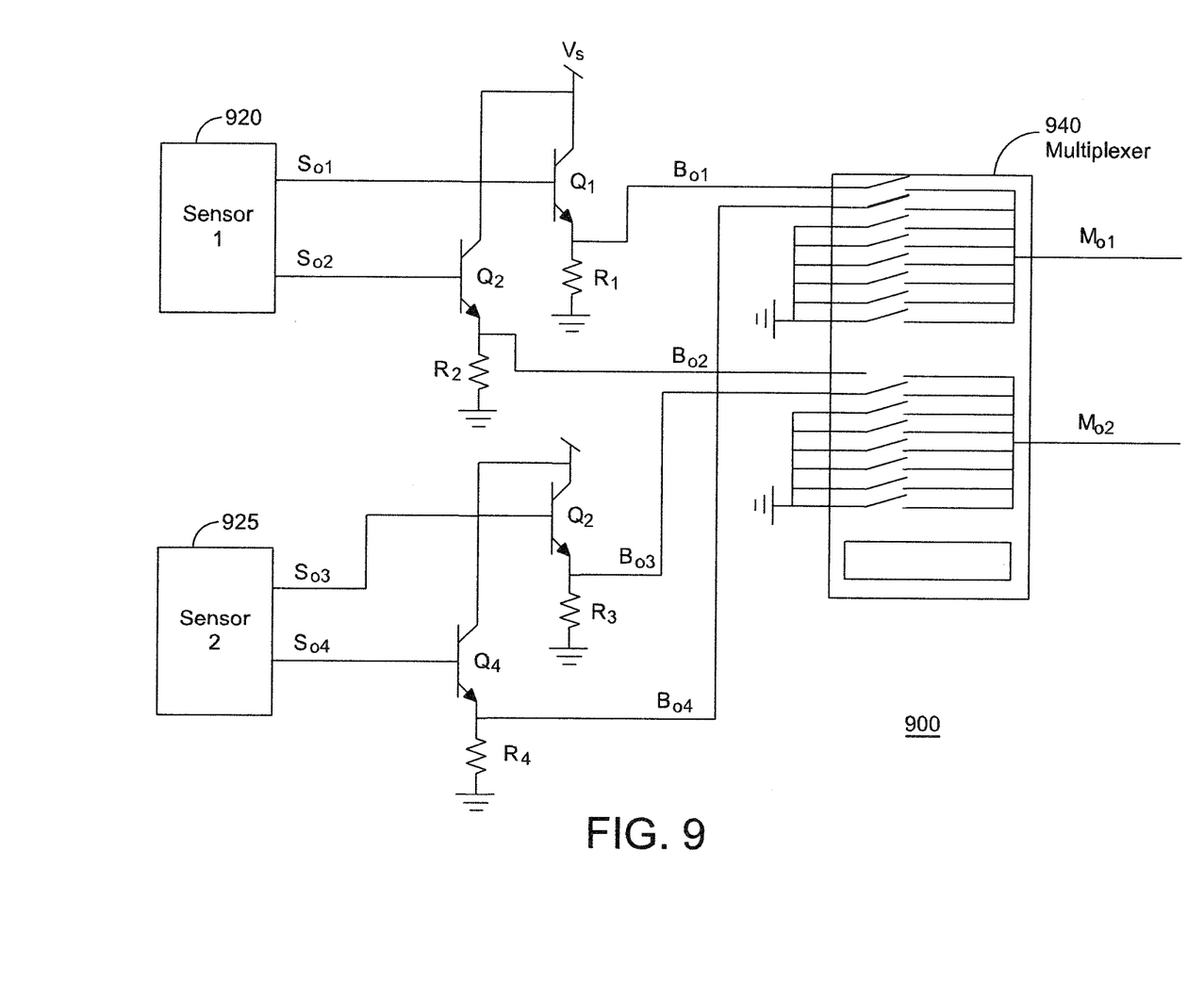
FIG. 9 is a schematic of an exemplary miniature electronic pressure scanner.

FIG. 9 is a schematic illustration of a portion of an exemplary miniature electronic pressure scanner 900 which depicts two buffered pressure sensors 920, 925. Pressure sensor 920 includes analog pressure sensor outputs SO1 and SO2. Sensor 925 includes analog sensor outputs SO3 and SO4. In the exemplary embodiment of FIG. 9, each of the sensor outputs is buffered by a transistor (Q) and a bias resistor (R). Transistor Q1 and resistor R1 buffer sensor output SO1, and provide a buffered output BO1 to the multiplexer 940. Similarly, transistor Q2 and resistor R2, transistor Q3 and resistor R3, and transistor Q4 and resistor R4 bias sensor outputs SO2, SO3, and SO4, respectively. Buffered outputs BO2, BO3, and BO4, respectively, are provided to multiplexer 940. The pressure sensors 920 and 925 may include trim and compensation resistors (not shown) as discussed with respect to the topological embodiment shown in FIG. 8. Multiplexer 940 includes outputs MO1 and MO2, which may output to an amplifier or A/D converter or other electrical device (not shown). As will be understood, the schematic of FIG. 9 is representative of a buffer configuration which may be used when the resistor and transistor buffer elements are bare elements, or when one or both of the buffer elements are integrated into the pressure sensor.

Figure 10A:
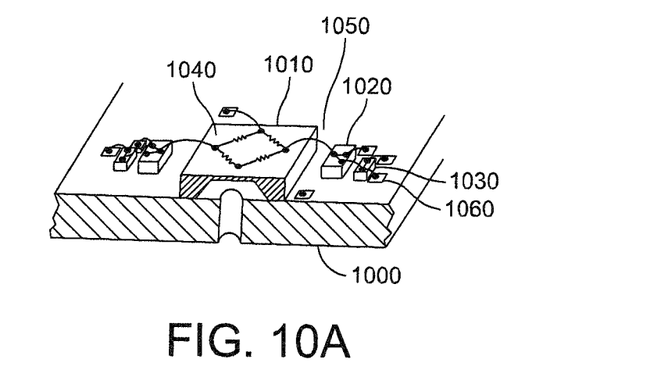
FIG. 10A is a perspective section view of an exemplary pressure sensor and buffer arrangement of an exemplary miniature electronic pressure scanner in which the transistor and resistor buffer elements are configured as bare die elements.
Figure 10B:
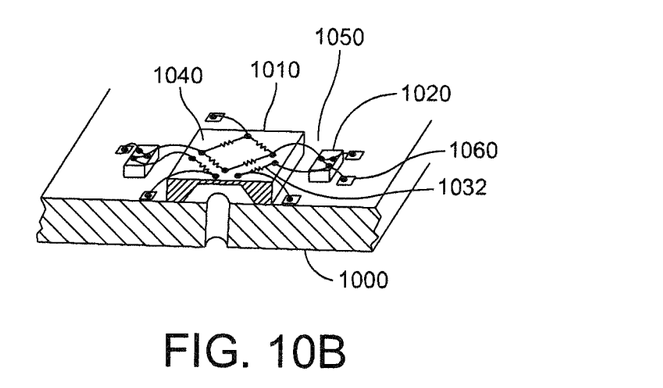
FIG. 10B is a perspective section view of an exemplary pressure sensor and buffer arrangement of an exemplary miniature electronic pressure scanner in which the transistor buffer element is configured as a bare die element and the resistor buffer element is integral to the sensor.
Figure 10C:
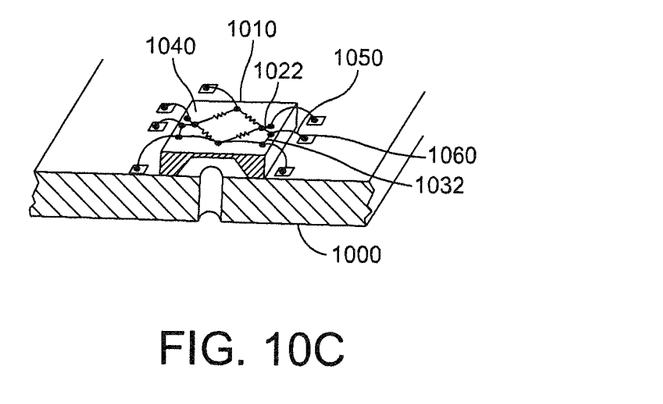
FIG. 10C is a perspective section view of an exemplary pressure sensor and buffer arrangement of an exemplary miniature electronic pressure scanner in which the transistor and resistor buffer elements are both integral to the pressure sensor.

FIGS. 10A, 10B, and 10C, respectively illustrate three embodiments of the pressure sensor and buffer configurations as described herein for implementation in a pressure scanner according to aspects of the present disclosure. As shown in FIGS. 10, 10B, and 10C, like reference numerals are used to indicate like parts. FIG. 10A provides a perspective section view of an exemplary pressure sensor of a miniature electronic pressure scanner in which the transistor and resistor buffer elements are bare die elements. FIG. 10B provides a perspective section view of an exemplary pressure sensor of a miniature electronic pressure scanner in which the transistor buffer element is a bare die element and the resistor buffer element is integral to the sensor. FIG. 10C provides a perspective section view of an exemplary pressure sensor of a miniature electronic pressure scanner in which the transistor and resistor buffer elements are both integral to the sensor.

Specifically, FIG. 10A shows substrate 1000 on which pressure sensor 1010 is mounted. The pressure sensor 1010 analog output is buffered by bare die transistor 1020 and bare die bias resistor 1030, providing buffered output(s) 1060. The pressure sensor 1010 includes circuitry, as illustrated by bridge circuit 1040 disposed atop the sensor. As will be understood by those in the art, the circuit is an illustration of the circuitry within the sensor and known integrated circuit technology may be used to implement the sensor circuitry within the sensor. For example, the pressure sensor may be a silicon based piezoresistive sensor having a micro-machined diaphragm onto which four (4) piezoresistors have been diffused. The piezoresistors are connected in a Wheatstone bridge configuration that generates a voltage output proportional to the pressure input, as is understood in the art. Wire jumpers 1050 from the sensor are used to electrically connect the bare die transistor 1020 and bias resistor 1030 to the sensor so the outputs of the sensor may be buffered.

FIG. 10B depicts an embodiment wherein the pressure sensor 1010 is buffered by bare die transistor 1020 adjacent sensor 1010 and wherein resistor 1032 is integral to the sensor. The bias resistors are shown schematically on the sensor for illustration purposes and may be functionally integrated into the sensor using known integrated circuit techniques. The sensor may include unused resistors that may be used to bias the transistor 1020, or additional resistors (ones not used for the sensor circuitry) may be integrated within the sensor so that they may be used with the buffer transistor 1020. Wire jumpers 1050 from the sensor are used to electrically connect the bare die transistor 1020 to the bias resistor 1032 integrated within the sensor, and also to provide buffered output(s) 1060. In another embodiment (not shown), the transistor for the buffer may be integral to the sensor circuitry and the bias resistor may be a bare element disposed on the substrate that is connected to the sensor using wire jumpers.

FIG. 10C depicts another embodiment showing pressure sensor 1010 mounted on a substrate and in which the transistor and bias resistor buffer elements are integrated onto the pressure sensor. Specifically, FIG. 10C shows a schematic illustration of transistor 1022 and resistor 1032 arranged with bridge circuit 1040 on the sensor 1010. As noted, the schematic is an illustration of the circuitry encompassed within the sensor using known integrated circuit technology is used to implement the sensor circuitry and buffer elements (transistor and resistor) within the sensor. Wire jumpers 1050 are used to electrically connect the sensor, transistor, and bias resistor on the sensor to the buffered output(s) 1060.

The disclosed method described herein may be automated by, for example, tangibly embodying a program of instructions upon a computer readable storage media capable of being read by a machine capable of executing the instructions. A general purpose computer is one example of such a machine, as are other known computing devices having processors, memory, hardware, software, and/or firmware. A non-limiting exemplary list of appropriate storage media well known in the art would include such devices as a readable or writeable CD, flash memory chips (e.g., thumb drives), various magnetic storage media, and the like.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A miniature pressure scanning system comprising:
    a plurality of miniature pressure sensors including a plurality of sensor outputs, each of the miniature pressure sensors including at least one sensor output for providing an analog output signal indicative of a detected pressure on a body, and each at least one sensor output having an associated output impedance;
    a plurality of buffers, each buffer electrically connected to the sensor output of a corresponding one of said miniature pressure sensors, and configured to reduce the associated output impedance of the corresponding miniature pressure sensor output coupled thereto, and further configured to provide at an output of said buffer the analog output pressure signal from the miniature pressure sensor; and
    a multiplexer coupled downstream of the plurality of buffers and configured to multiplex the buffered analog output pressure signals to output a multiplexed analog signal representing the detected pressures.

2. The miniature pressure scanning system of claim 1, wherein each said buffer comprises a buffer transistor and a bias resistor.

3. The miniature pressure scanning system of claim 2, wherein one or both of said buffer transistor and said bias resistor are integral to the one of the plurality of miniature pressure sensors whose sensor output is being buffered.

4. The miniature pressure scanning system of claim 2, wherein each said buffer transistor is one of a bipolar junction transistor, a field-effect transistor, a metal oxide semiconductor field-effect transistor, and an insulated-gate bipolar transistor.

5. The miniature pressure scanning system of claim 1, wherein the multiplexer has a plurality of input channels and wherein each input channel is selectively connected to a respective output of the plurality of buffers.

6. The miniature pressure scanning system of claim 5, wherein the multiplexer is operative to be switched at a rate of about 50 micro seconds.

7. The miniature pressure scanning system of claim 2, wherein each of the buffer transistor and the bias resistor is a bare die element mounted on a substrate of the miniature pressure scanning system separate and adjacent to the corresponding miniature pressure sensor.

8. The miniature pressure scanning system of claim 7, wherein a ratio of an area of the bare die buffer transistor to an area of the miniature pressure sensor is about 5%.

9. The miniature pressure scanning system of claim 2, wherein the transistor and the bias resistor of each buffer are configured to reduce the associated output impedance of the sensor output coupled to it by at least two orders of magnitude.

10. A method comprising:
    sensing pressure using a miniature pressure scanning system including a plurality of miniature pressure sensors including a plurality of sensor outputs, each of the plurality of miniature pressure sensors having at least one sensor output for providing an analog output signal and each at least one sensor output having an associated output impedance;
    buffering the at least one sensor output of the plurality of miniature pressure sensors to provide a buffered sensor output, thereby reducing the associated output impedance of each buffered sensor output;
    multiplexing, using at least one multiplexer, the plurality of buffered sensor outputs and switching between channels of the at least one multiplexer, thereby reading the analog output signal of each buffered sensor output of the miniature pressure sensors.

11. The method of claim 10, wherein buffering the at least one sensor output of the plurality of miniature pressure sensors comprises electrically coupling one of a buffer transistor and a bias resistor to each sensor output being buffered.

12. The method of claim 11, wherein one or both of said buffer transistor and said bias resistor is integral to a corresponding one of the plurality of miniature pressure sensors whose sensor output is being buffered.

13. The method of claim 11, wherein one or both of said buffer transistor and said bias resistor of each buffer is a bare die element mounted on a substrate of the miniature pressure scanning system.

14. The method of claim 11, wherein each said buffer transistor is one of a bipolar junction transistor, a field-effect transistor, a metal oxide semiconductor field-effect transistor, and an insulated-gate bipolar transistor.

15. The method of claim 10, wherein the at least one multiplexer has at least 16 input channels and wherein switching between channels of the at least one multiplexer comprises switching at a rate of 50 micro seconds or faster per buffered sensor output.

16. The miniature pressure scanning system of claim 2, wherein the buffer transistor input is directly coupled to the output of the corresponding miniature pressure sensor whose output is being buffered.

17. A miniature pressure scanning system comprising:
- an array of silicon piezoresistive pressure sensors including a plurality of sensor outputs, each of the pressure sensors including at least one sensor output for providing an analog output signal and having an associated output impedance;
- a plurality of buffers, each buffer of said plurality of buffers being electrically coupled to the at least one sensor output of each of the array of silicon piezoresistive pressure sensors thereby providing a plurality of buffered outputs, each said buffer comprising one of a plurality of transistors and one of a plurality of bias resistors and each said buffer being operative to reduce an output impedance of the sensor output it is coupled to; and
- at least one multiplexer electrically coupled to the plurality of buffered sensor outputs, said at least one multiplexer being operative to be switched between each buffered sensor output of the plurality of buffered sensor outputs.

18. The miniature pressure scanning system of claim 17, wherein one or both of said one of the plurality of transistors and said one of the plurality of bias resistors is a bare die element mounted on a substrate of the miniature pressure scanning system.

19. The miniature pressure scanning system of claim 17, wherein one or both of said one of the plurality of transistors and said one of the plurality of bias resistors of at least one of the buffers are integral to the pressure sensor whose sensor output is being buffered.

20. The miniature pressure scanning system of claim 17, wherein the at least one multiplexer is operative to be switched at a rate of 50 micro seconds per buffered sensor output or faster; and wherein each buffer is configured to reduce the output impedance of the sensor output it is coupled to by at least two orders of magnitude.

* * * * *